United States Patent
Edwards et al.

(10) Patent No.: US 10,553,220 B2
(45) Date of Patent: *Feb. 4, 2020

(54) METHOD AND SYSTEM FOR VOICE INPUT AT AN ATM WITHOUT AUDIBLY REVEALING A SELECTED TRANSACTION

(71) Applicant: Capital One Services, LLC, McLean, VA (US)

(72) Inventors: Joshua Edwards, Philadelphia, PA (US); Abdelkader Benkreira, New York, NY (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,937

(22) Filed: Sep. 6, 2019

(65) Prior Publication Data

US 2019/0392843 A1 Dec. 26, 2019

Related U.S. Application Data

(63) Continuation of application No. 16/002,358, filed on Jun. 7, 2018, now Pat. No. 10,446,158.

(51) Int. Cl.
*H04K 1/00* (2006.01)
*G06Q 20/32* (2012.01)
*G06Q 20/10* (2012.01)
*G10L 17/24* (2013.01)

(52) U.S. Cl.
CPC ......... *G10L 17/24* (2013.01); *G06Q 20/1085* (2013.01); *G06Q 20/108* (2013.01); *G06Q 20/32* (2013.01); *H04K 1/00* (2013.01)

(58) Field of Classification Search
CPC ......... H04K 1/00; G06Q 20/32; G06Q 20/108
See application file for complete search history.

(56) References Cited

U.S. PATENT DOCUMENTS

| | | | |
|---|---|---|---|
| 6,016,476 A | 1/2000 | Maes et al. | |
| 6,519,699 B2 | 2/2003 | Lu et al. | |
| 10,446,158 B1 * | 10/2019 | Edwards | |
| 2005/0273626 A1 | 12/2005 | Pearson et al. | |

FOREIGN PATENT DOCUMENTS

KR 20-0366390 10/2004

* cited by examiner

*Primary Examiner* — Farzad Kazeminezhad
(74) *Attorney, Agent, or Firm* — DLA Piper LLP (US)

(57) ABSTRACT

Embodiments disclosed herein generally relate to a system and method for transacting at an ATM. A computing system receives a request from the ATM to provide audio commands for an input having one or more components. The computing system generates an audio message for a component of the one or more components. The computing system receives an indication from the user to select an entry from the set of candidate entries as the component. The indication from the user does not include a recitation of the first entry. The computing system maps the indication to a respective candidate in the set of candidate entries. The computing system generates a verification audio message for the user to audibly verify a correct mapping between the indication and the respective candidate in the set of candidate entries. The computing system receives an audible verification from the user.

20 Claims, 5 Drawing Sheets

METHOD AND SYSTEM FOR VOICE INPUT AT AN ATM WITHOUT AUDIBLY REVEALING A SELECTED TRANSACTION

CROSS-REFERENCE TO RELATED APPLICATIONS

This is a continuation of U.S. application Ser. No. 16/002,358, filed Jun. 7, 2018, the content of which is hereby incorporated by reference in its entirety.

FIELD OF THE DISCLOSURE

The present disclosure generally relates to a method and a system for providing voice input at an automated teller machine (ATM).

BACKGROUND

Conventional automated teller machines (ATMs) require human intervention or human interface with a display of the ATM. For example, when an account holder wants to withdraw money from his or her account, the account holder interfaces with the ATM's display to enter the account holder's credentials (e.g., PIN) number, and then navigate through a pre-set number of screens to withdraw a desired amount of funds from the account. Accordingly, the ATM provides a gateway for the end user to manage or manipulate his or her account with a financial services organization.

SUMMARY

Embodiments disclosed herein generally relate to a system and method for transacting at an automated teller machine (ATM). A computing system receives a request to provide audio commands for an input having one or more components. The computing system generates an audio message for a component of the one or more components. The audio message includes a set of candidate entries. The computing system receives an indication from the user to select an entry from the set of candidate entries as the component. The indication from the user does not include a recitation of the first entry. The computing system maps the indication to a respective candidate in the set of candidate entries. The computing system generates a verification audio message for the user to audibly verify a correct mapping between the indication and the respective candidate in the set of candidate entries. The computing system receives an audible verification from the user.

In some embodiments, the computing system generates a further audio message for a further component of the one or more components. The further audio message includes a further set of candidate entries. The computing system receives a further indication from the user to select a further entry from the further set of candidate entries as the further component. The further indication from the user does not include a recitation of the further entry. The computing system maps the further indication to a further respective candidate in the further set of candidate entries. The computing system generates a further verification audio message for the user to audibly verify a correct mapping between the further indication and the further respective candidate in the further set of candidate entries. The computing system receives a further audible verification from the user.

In some embodiments, the first set of candidate entries and the further set of candidate entries are equivalent.

In some embodiments, receiving the request to provide audio commands for the input having one or more components in the ATM includes the computing system receiving a request to enter a personal identification number (PIN) that includes one or more digits. Each digit corresponds to a respective component of the one or more components.

In some embodiments, receiving the request to provide audio commands for the input having one or more components in the ATM includes the computing system receiving a request to enter a withdrawal amount.

In some embodiments, generating the audio message for the component of the one or more components is triggered by identifying an auxiliary connection is established.

In some embodiments, the computing system determines that the established auxiliary connection is broken. The computing system halts the request to provide audio commands until the auxiliary connection is re-established.

In another embodiment, a system is disclosed herein. The system includes a processor and a memory. The processor is in selective communication with a microphone and a speaker. The memory has programming code, which, when executed by the processor, performs an operation of transacting at an automated teller machine (ATM). The operation includes receiving a request to provide audio commands for an input having one or more components. The operation further includes identifying that a communication link has been established between the processor and the microphone and speaker. The operation further includes generating an audio message for a component of the one or more components, the audio message comprising a set of candidate entries. The operation further includes delivering the audio message to the user via the speaker. The operation further includes receiving an indication from the user via the microphone to select an entry from the set of candidate entries as the component. The indication from the user does not include a recitation of the first entry. The operation further includes mapping the indication to a respective candidate in the set of candidate entries. The operation further includes generating a verification audio message for the user to audibly verify a correct mapping between the indication and the respective candidate in the set of candidate entries. The operation further includes delivering the verification audio message to the user via the speaker. The operation further includes receiving an audible verification from the user via the microphone.

In some embodiments, the operation further includes generating a further audio message for a further component of the one or more components, the further audio message comprising a further set of candidate entries. The operation further includes delivering the further audio message to the user via the speaker. The operation further includes receiving a further indication from the user via the microphone to select a further entry from the further set of candidate entries as the further component. The further indication from the user does not include a recitation of the further entry. The operation further includes mapping the further indication to a further respective candidate in the further set of candidate entries. The operation further includes generating a further verification audio message for the user to audibly verify a correct mapping between the further indication and the further respective candidate in the further set of candidate entries. The operation further includes delivering the verification audio message to the user via the speaker. The operation further includes receiving a further audible verification from the user via the microphone.

In some embodiments, the first set of candidate entries and the further set of candidate entries are equivalent.

In some embodiments, the processor and memory and positioned within the ATM.

In some embodiments, the operation of receiving the request to provide audio commands for the input having one or more components includes receiving a request to enter a personal identification number (PIN) that comprises one or more digits. Each digit corresponds to a respective component of the one or more components.

In some embodiments, the operation of receiving the request to provide audio commands for the input having one or more components includes receiving a request to enter a withdrawal amount.

In some embodiments, the operation further includes determining that the communication link is broken and halting the request to provide audio commands until the communication link is re-established.

In some embodiments, the memory further includes a Bluetooth module for selective communication with a client device of the user.

In another embodiment, a method of transacting at an automated teller machine (ATM) is disclosed herein. A computing system determines that an auxiliary connection is established between a user and the ATM. The computing system receives an audio request from the user to input a personal identification number (PIN). The PIN includes one or more digits. The computing system generates an audio message for a digit of the one or more digits. The audio message comprising a set of candidates. The computing system provides the audio message to the user via the auxiliary connection. The computing system receives an indication from the user to select an entry from the set of numbers as a digit of the one or more digits of the PIN. The indication from the user does not include a recitation of the entry. The computing system continues to generate subsequent audio messages for subsequent digits of the one more digits, providing the subsequent audio messages to the user, and receiving subsequent indications from the user to select subsequent entries from the set of numbers as a respective digit of the one or more digits of the PIN until each digit of the one or more digits of the PIN are entered.

In some embodiments, the computing system determines that the auxiliary connection between the user and the ATM is broken and halts the generating of the audio message until the auxiliary connection is re-established.

In some embodiments, wherein the set of candidates are transmitted to the user in a pattern that is a sequential array of numbers.

In some embodiments, a duration of a gap between each candidate in the set of candidates varies.

In some embodiments, receiving the indication from the user includes a reply message comprising one or more of back one, forward one, and stop.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for providing voice input at an automated teller machine (ATM). In particular, when an account holder wants to interact with his or her account (e.g., withdraw funds, deposit funds, check balance, etc.), an ATM may provide the bridge between the user and the financial services organization. For example, the account holder may interface with the ATM's display to enter the account holder's credentials (e.g., PIN) number, and then navigate through a pre-set number of screens to withdraw a desired amount of funds from the account. Conventional ATMs, however, are not well equipped at catering to account holders that may be vision impaired.

The one or more techniques described herein addresses this shortcoming of conventional ATMs by reconfiguring the ATM's controller to allow for voice input in place of the traditional screen navigating. The user may request voice input upon connecting an audio input/output (I/O) device to the ATM. For example, the user may request voice input upon the ATM detecting a wireless or wired connection to the user's headphones. By restricting voice input to those situations in which an audio I/O device is detected, the ATM can broadcast audio commands to the user discretely (i.e., via headphones). Similarly, a user may provide voice input to the ATM discretely (e.g., through generic responses).

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
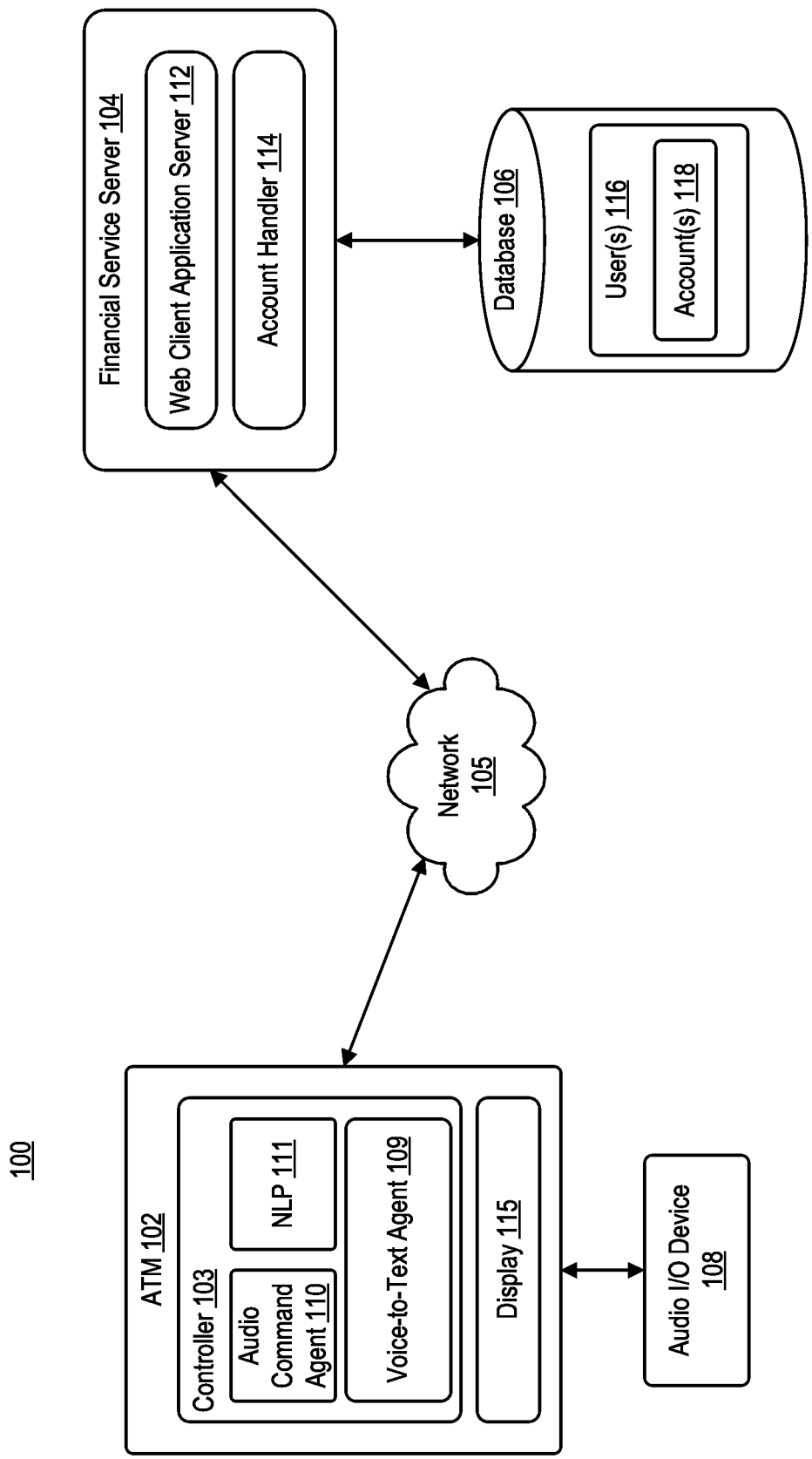
FIG. 1 is a block diagram illustrating an exemplary computing environment, according to one embodiment.

FIG. 1 is a block diagram illustrating a computing environment 100, according to one embodiment. Computing environment 100 may include an automated teller machine (ATM) 102 and financial services server 104 communicating via network 105. ATM 102 may be operated by one or more users. For example, a user may operate ATM 102 to perform one or more functions associated with a user's bank account. Such functions may include, for example, withdrawing funds, depositing funds, transferring funds, checking an account balance, and the like. In operation, a user may obtain ATM 102 functionality via an ATM card assigned to the user. For example, a user may obtain ATM 102 access by inserting the user's ATM card and entering a personal identification number (PIN) preset by the user.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receiving information between the components of environment 100.

ATM 102 may include a controller 103 and display 115. Controller 103 may be a computing system that is configured to facilitate communication between financial services server 104 and the user. Controller 103 may include audio command agent 110, Voice-to-Text agent 109, and natural language processor (NLP) 111. Audio command agent 110 may be configured to transmit audio messages to a user of ATM 102 as well as receive audio commands from user. Audio command agent 110 may interface with an audio input/output (I/O) device 108. Such audio I/O devices may include, for example, a device that includes at least speakers such that the user of I/O device 108 can hear audio commands from ATM 102 without a passerby being able to interpret the audio commands. Further, such I/O devices 108 may include a microphone configured to capture the user's sounds/words. In some embodiments, ATM 102 may include a microphone installed therein. In some embodiments, a user's headphones may include a microphone and speakers to interact with ATM 102.

Voice-to-text agent 109 may be configured to decipher one or more audio messages transmitted from user to ATM 102. For example, Voice-to-text agent 109 may translate the received audio messages to text for subsequent processing by controller 103. For example, NLP 111 may be configured to process the translated text-based message. Upon processing the text-based message, audio command agent 110 may be further configured to generate audio commands to be transmitted to user.

Audio command agent 110 may be enabled responsive to audio command agent 110 detecting a connection with audio I/O device 108. In some embodiments, the connection between audio I/O device 108 and audio command agent 110 may be a wired connection (e.g., an auxiliary connection, a USB-C connection, lightening connection, etc.). In some embodiments, the connection between audio I/O device 108 and audio command agent 110 may be wireless (e.g., Bluetooth, ZigBee, NFC, etc.).

In operation, ATM 102 may receive a request from user for audio commands upon audio command agent 110 detecting an audio connection with an I/O device 108 of the user. Upon detecting this connection, audio command agent 110 may provide user with one or more command options. Such audio commands may be beneficial, for example, in situations when a vision-impaired user is attempting to operate ATM 102. However, rather than audibly broadcast audio commands to the user such that passerbys can hear and decipher the communication between the user and ATM 102, the present system utilizes audio I/O device 108 to discretely communicate options to the user such that passerbys would not be able to hear the options communicated to the user. Further, through audio I/O device 108, ATM 102 may also discretely receive confirmations or requests from the user in the form of simple responses that may be mapped to options communicated to the user. For example, rather than the user audibly reciting his or her PIN, audio command agent 110 may recite a list of candidate numbers to the user for a first digit of a user's PIN and wait for the user to select an option from the list.

Upon receipt of a request from ATM 102, ATM 102 may communicate the request to financial services server 104. The request may include, at a minimum, the request from the user as well as a user identifier. The user identifier may include the user's account number, social security number, debit card number, credit card number, address, and the like. Financial services server 104 may include an account handler 114. Account handler 114 may be configured to receive the request from ATM 102 and manage an account associated with the user to carry out the request. Account handler 114 may communicate with database 106. Database 106 may include one or more user profiles 116. Each user profile 116 may include one or more accounts 118. Such accounts may include, for example, credit card accounts, savings accounts, checking accounts, and the like.

In operation, for example, upon receiving a user identifier (e.g., account number) and PIN from ATM 102, account handler 114 may carry out an authentication request by querying the database 106 with the user's account number to determine whether the received PIN matches the PIN in user profile 116. Upon authenticating the user, financial services server 104 may transmit a confirmation back to ATM 102, such that ATM 102 can provide the user with further prompts for further requests. Such authentication of the user may establish a "session" between the user and the financial services server 104.

In another operation, for example, upon a session being established between the user and financial services server 104, account handler 114 may carry out a withdrawal request from the user by querying database 106 to determine whether there are sufficient funds in user's account 118 to satisfy the request. Upon determining there are sufficient funds, financial services server 104 may transmit a confirmation message to ATM 102. In some embodiments, along with the confirmation message, financial services server 104 may further transmit a message containing an updated balance of the user's account 118.

Figure 2:
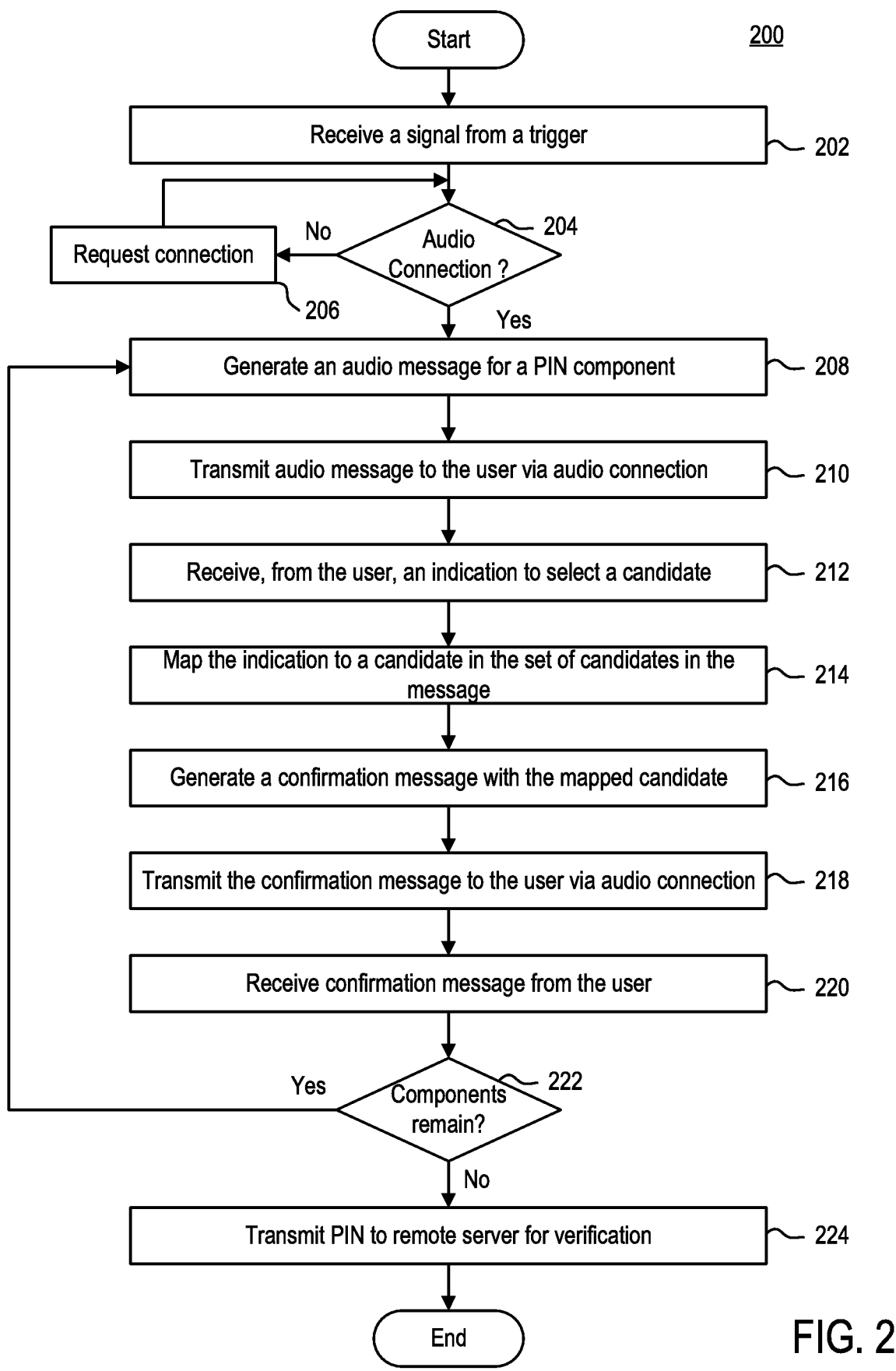
FIG. 2 is a flow diagram illustrating an exemplary method of receiving voice input at an ATM, according to one embodiment.

FIG. 2 is a flow diagram illustrating an exemplary method 200 of receiving voice input at an ATM (e.g., ATM 102), according to one embodiment. Method 200 begins at step 202. At step 202, ATM 102 may receive a signal from a trigger. In some embodiments, the signal, for example, may be a request to access an account associated with the user. In some embodiments, the trigger may be a manual input on a screen of ATM 102. In some embodiments, the trigger may be an audio connection established between ATM 102 and audio I/O device 108. For example, the audio connection may be a wired connection between ATM 102 and audio I/O device 108 or a wireless connection between ATM 102 and audio I/O device 108.

At step 204, ATM 102 may determine whether an audio connection is established between ATM 102 and user. For example, ATM 102 may determine whether an audio I/O device 108 has been connected to audio command agent 110 via a wired or wireless connection. If, at step 204, ATM 102 determines that there is not an audio connection established between ATM 102 and the user, method 200 proceeds to step 206. At step 206, ATM 102 may prompt the user to establish the audio connection to proceed.

If, however, at step 204, ATM 102 determines that there is an audio connection established between ATM 102, then method 200 proceeds to step 208. At step 208, ATM 102 may generate an audio message to be transmitted to user. ATM 102 may generate an audio message for a first component of user's PIN. The audio message may include for example, a string of numbers to be recited to the user. The string of numbers may include single digit numbers that are possible candidates for a first component of user's PIN. In some embodiments, the string of numbers are in numerical order (e.g., 1, 2, 3, . . . 9). In some embodiments the string of numbers are recited in a pre-defined order (e.g., 2, 4, 6, 8, 1, 3, 5, 7, 9). In some embodiments, the string of numbers is recited in a random (or pseudorandom) order.

At step 210, ATM 102 may transmit the audio message to the user via the audio connection. In some embodiments, the message may be transmitted to the user, such that the user can adjust the speed at which each candidate (i.e., number) is recited to the user. In some embodiments, the message may be transmitted to the user at a pre-defined speed. In some embodiments, the speed between candidates may vary. For example, the gap between a first candidate and a second candidate may be about one second, while the gap between the second and a third candidate may be about a half second.

At step 212, ATM 102 may receive, from the user, an indication to select an entry in the set of candidates. For example, audio command agent 110 may receive the indication from the user via a microphone (either the ATM's or the audio I/O device's). Such indication, for example, may include a simple "yes" following a recitation of a candidate in the message. For example, following candidate "2" in the message, the user may respond with "yes."

At step 214, ATM 102, upon receiving the indication, may map the indication to a candidate in the set of candidates in the message. For example, audio command agent 110 may receive and parse the indication from the user. Upon parsing the indication, audio command agent 110 may identify to which candidate in the set of candidates the indication corresponds. In some embodiments, audio command agent may identify to which candidate in the set of candidates the indication corresponds by pairing the time in which ATM 102 receives the response from the user with the duration of time since the audio message started to play.

At step 216, ATM 102 may generate a confirmation message to be transmitted to the user. For example, audio command agent 110 may generate a confirmation message such that the user can audibly confirm that audio command agent 110 correctly mapped the indication to a particular candidate. Continuing with the above example, upon mapping the user's indication to "2," audio command agent 110 may generate a message that recites "You entered 2. Is this correct?"

At step 218, ATM 102 may transmit the confirmation message to the user via the audio connection. At step 220, ATM 102 may receive a confirmation from the user. For example, user may have listened to the confirmation message via audio I/O device 108, and, upon reviewing the confirmation message, affirmed that the mapping between the user's indication and the candidate is correct. In some embodiments, ATM 102 may receive a corrective response from the user. For example, upon receiving a confirmation message from ATM 102 seeking confirmation on the selection of "1" in the string "2 . . . 5 . . . 7 . . . 1," the user may respond with "back three" thus notifying ATM 102 that the mapping was incorrect, and what the correct mapping should be.

At step 222, ATM 102 may determine whether there are remaining components in user's PIN. For example, audio command agent 110 may generate a message asking the user whether there are additional components to user's PIN. Such message may include, for example, "Do you wish to submit an additional component?" Upon receiving an indication that there are remaining components to user's PIN (e.g., a "Yes" to the above question), method 200 reverts to step 208, and audio command agent 110 may generate a subsequent audio message to be transmitted to user. For example, audio command agent 110 may generate an audio message for a further component of user's PIN. If, however, at step 222, ATM determines that there are no remaining components to user's PIN, then method 200 may end.

Figure 3:
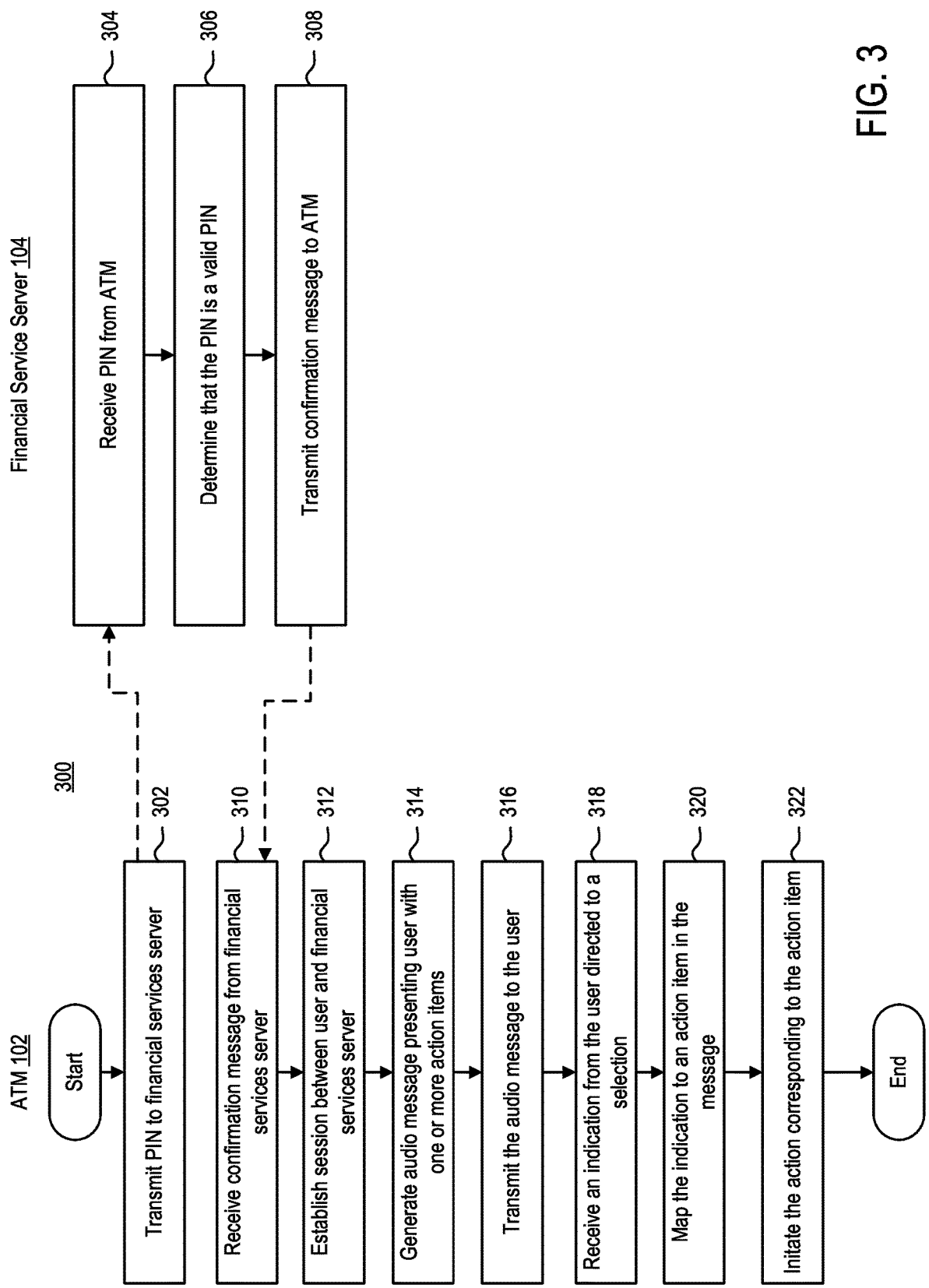
FIG. 3 is a flow diagram illustrating an exemplary method of receiving voice input at an ATM, according to one embodiment.

FIG. 3 is a flow diagram an exemplary method 300 of transacting at an ATM (e.g., ATM 102) using audio commands, according to one embodiment. For example, method 300 may be performed subsequent to ATM 102 receiving a PIN for the user, such as described above in conjunction with FIG. 2.

Method 300 begins at step 302. At step 302, ATM 102 may transmit the PIN to financial services server. For example, after receiving audible indications from user to input a PIN, ATM 102 may transmit a message containing the user's PIN to financial services server 104. Such message may include the user's PIN as well as a user identifier. The user identifier may include a user's name, account number, debit card number, credit card number, social security number, phone number, and the like.

At step 304, financial services server 104 may receive the PIN from ATM 102. At step 306, financial services server 104 may determine whether the PIN received from ATM 102 is a valid PIN. In some embodiments, account handler 114 may query database 106 with the received user identifier to identify a user profile 116 associated therewith. Based on the identified user profile 116, account handler 114 may verify the PIN by determining whether the PIN matches a PIN associated with an account 118 in user's profile 116.

At step 308, financial services server 104 may transmit a confirmation message to ATM 102 that confirms the received PIN. At step 310, ATM 102 may receive the confirmation from financial services server 104. Upon receiving the confirmation from financial services server 104, at step 312, ATM 102 may establish a session between the user and financial services server 104. Such session may allow the user to access functionality of financial services server 104 via ATM 102. For example, the user may be able to withdraw funds, deposit funds, transfer funds, check account information, and the like, during the session.

At step 314, ATM 102 may generate an audio message presenting the user with one or more action items. For example, audio command agent 110 may generate an audio message that provides the user with one or more options. Such options may include, for example, "check balance," "deposit check," "deposit cash," "withdrawal," "transfer funds," "purchase stamps," and the like. In some embodiments, the audio message generated by audio command agent 110 may present the options to the user in a pre-defined order, such as that provided above. In some embodiments, the audio message generated by audio command agent 110 may present the options to the user in a random (or pseudorandom) order. In this manner, passerbys will not be able to predict the option selected by the user. In some embodiments, ATM 102 may allow the user to specify the preference in which the user is presented with candidates. For example, the user may store in his or her account, one or more preference related to audio commands from ATM 102.

At step 316, ATM 102 may transmit the audio message to the user. For example, audio command agent 110 may transmit the audio message with the one or more options to the user via the audio connection. At step 318, ATM 102 may receive an indication from the user directed to a selection of an option in the audio message. For example, audio command agent 110 may receive the indication from the user via a microphone (either the ATM's or the audio I/O device's). Such indication, for example, may include a simple "yes" following a recitation of an option in the message. For example, following the option "Deposit Funds" in the message, the user may respond with "yes." In another example, following candidates "Deposit Funds . . . Withdraw Funds," the user may respond with "go back one."

At step 320, ATM 102, upon receiving the indication, may map the indication to a candidate in the set of candidates in the message. For example, audio command agent 110 may receive and parse the indication from the user. Upon parsing the indication, audio command agent 110 may identify to which candidate in the set of candidates the indication corresponds. Continuing with the above example, upon receiving an indication of the form "go back one," audio command agent 110 may map the indication to "Deposit Funds" in the message "Deposit Funds . . . Withdraw Funds."

At step 322, ATM 102 may initiate the action corresponding to the mapped option. For example, ATM 102 may work in conjunction with financial services server 104 to access user's account, such that user may, for example, deposit funds to his or her account.

Figure 4:
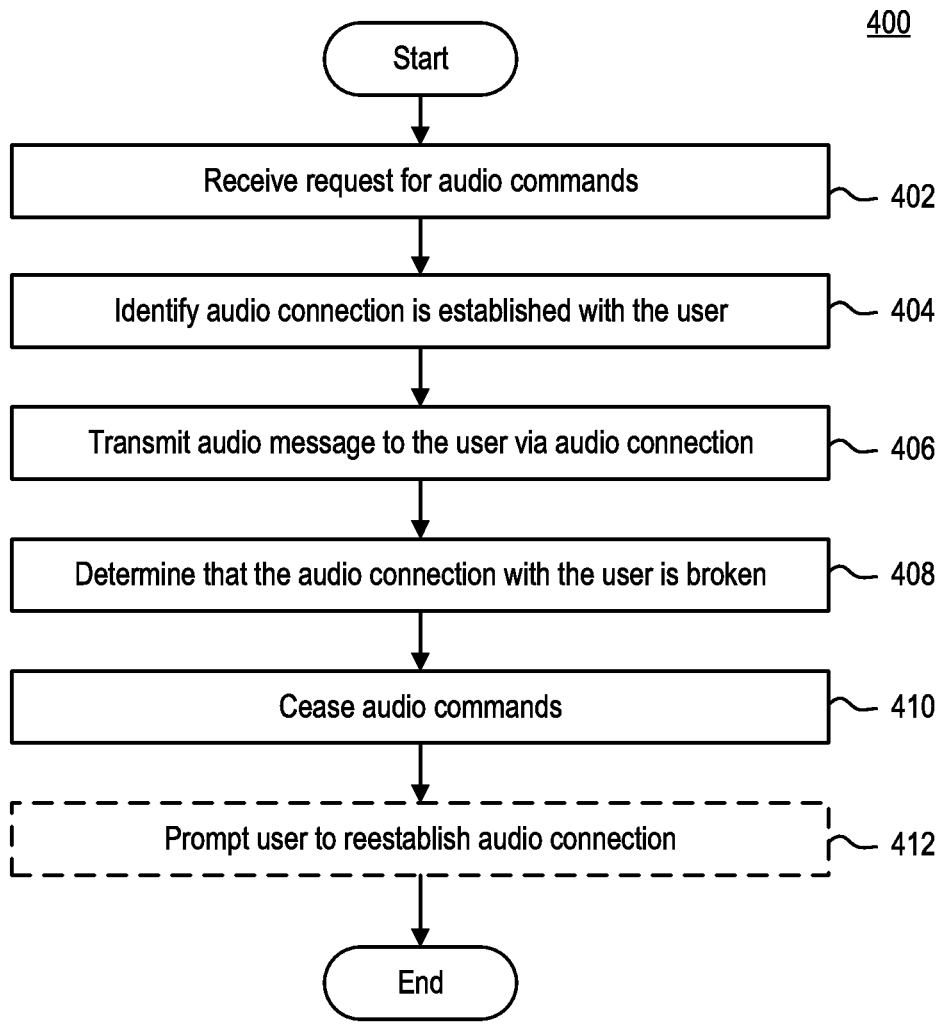
FIG. 4 is a flow diagram illustrating an exemplary method of receiving voice input at an ATM, according to one embodiment.

FIG. 4 is a flow diagram illustrating a method 400 of transacting at an ATM (e.g., ATM 102) using audio commands, according to one embodiment. For example, method 400 may be performed in conjunction with the method 200, 300 discussed above.

Method 400 begins at step 402. At step 402, ATM 102 may receive a request for audio commands. In some embodiments, the request for audio commands may take the form of an audio connection established between the ATM 102 and the user via audio I/O device 108. In some embodiments, the request for audio commands may take the form of a manual input via a graphical user interface displayed to the user.

At step 404, ATM 102 may identify that an audio connection is established with the user. In some embodiments, the audio connection may be a wired connection between the user and ATM 102. In some embodiments, the audio connection may be a wireless connection between the user and ATM 102.

At step 406, ATM 102 may transmit an audio message to the user via the audio connection. In some embodiments, the audio connection may include one or more candidates for entry of a PIN by the user. In some embodiments, the audio connection may include one or more options that a user my select.

At step 408, ATM 102 may determine that the audio connection with the user is broken. In some embodiments, ATM 102 may determine that the wired connection with the user is broken (e.g., the auxiliary cord was removed from an auxiliary port of ATM 102). In some embodiments, ATM may determine that the wireless connection with the user is broken (e.g., the Bluetooth connection with the user is interrupted).

At step 410, ATM 102 may cease audio commands upon determining that the audio connection with the user is broken. In some embodiments, ATM 102 may immediately terminate a session established with the user upon determining that the audio connection with the user is broken. In some embodiments, ATM 102 may terminate the session after a predetermined period has elapsed. In some embodiments, method 400 may include step 412. At step 412, upon determining that the audio connection with the user is broken, ATM 102 may prompt user to reestablish the audio connection. In some embodiments, ATM 102 may prompt user by displaying a message via a graphical user interface. In some embodiments, ATM 102 may prompt the user audibly, by transmitting a message to the user via speakers in ATM 102.

Figure 5:
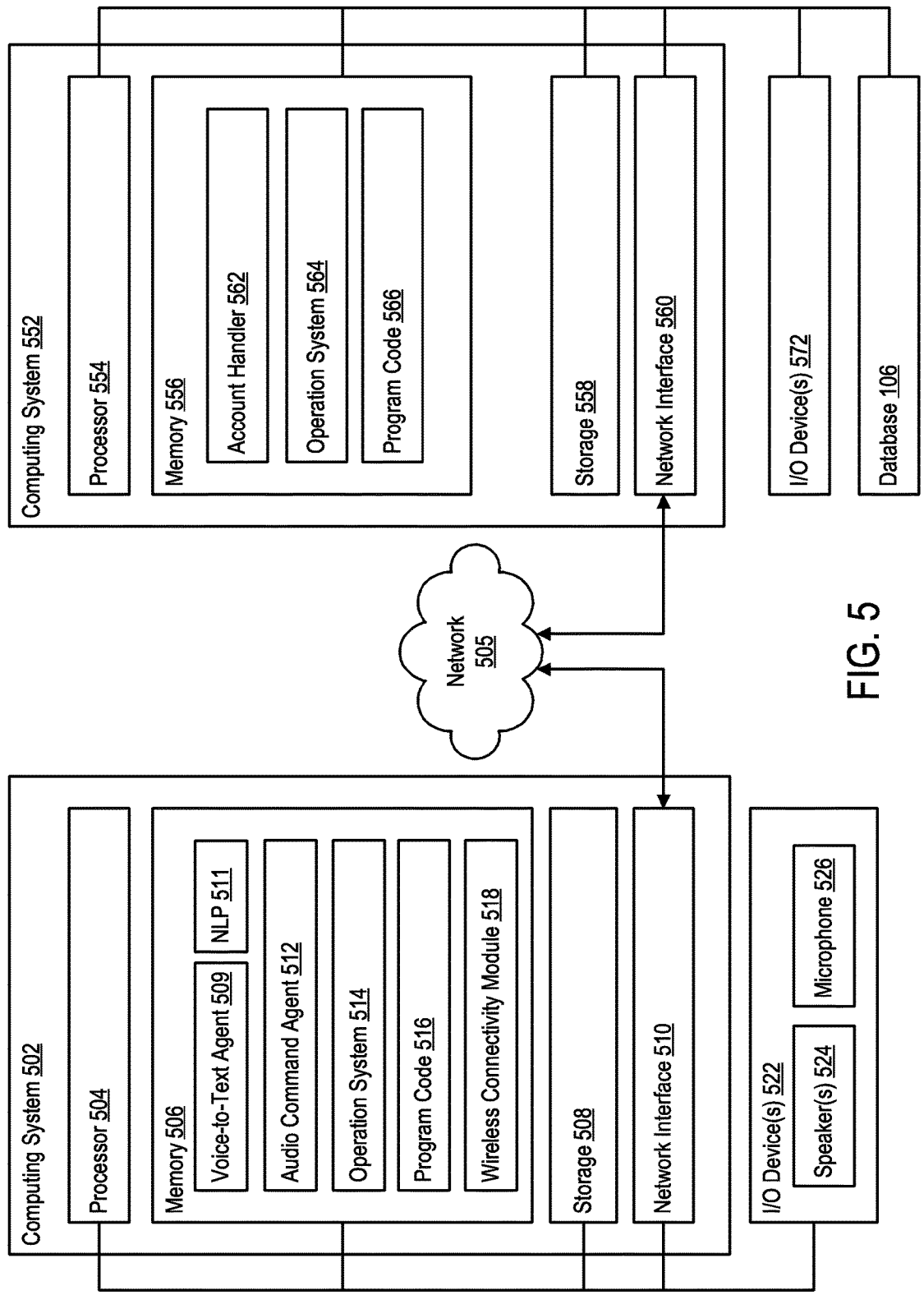
FIG. 5 illustrates an exemplary computing environment, according to one embodiment.

FIG. 5 is a block diagram illustrating an exemplary computing environment 500, according to one embodiment. Computing environment 500 includes computing system 502 and computing system 552. Computing system 502 may be representative of controller 103 of ATM 102. Computing system 552 may be representative of financial services server 104.

Computing system 502 may include a processor 504, a memory 506, a storage 508, and a network interface 510. In some embodiments, computing system 502 may be coupled to one or more I/O device(s) 522. One or more I/O devices 522 may include at least a speaker 524 and a microphone 526. In some embodiments, speaker 524 and microphone 526 may be packaged in a single unit. In some embodiments, speaker 524 and microphone 526 may be packaged separately.

Processor 504 may retrieve and execute program code 516 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications enabling computing system 502 to communicate externally via computing network 505. For example, network interface 510 allows computing system 502 to communicate with computer system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include a voice-to-text agent 509, natural language processor (NLP) 511, audio command agent 512, operating system 514, program code 516, and wireless connectivity module 518. Program code 516 may be accessed by processor 504 for processing (i.e., executing program instructions). Program code 516 may include, for example, executable instructions configured to perform steps discussed above in conjunction with FIGS. 2-4. As an example, processor 504 may access program code 516 to perform operations for transacting at an ATM (e.g., ATM 102) using audio commands. Audio command agent 512 may be configured facilitate transacting at ATM 102 using audio commands. For example, audio command agent 512 may be configured to transmit audio messages to a user of ATM 102 as well as receive audio commands from user. Audio command agent 110 may interface with an audio input/out device (e.g., speaker 524, microphone 526, audio I/O device 108). Voice-to-text agent 509 and NLP 511 may work in conjunction with audio command agent 512. Voiceto-text Agent 509 may be configured to decipher one or more audio messages transmitted from user to computing system 502. For example, voice-to-text agent 509 may translate the received audio messages to text for subsequent processing by processor 504. For example, NLP 511 may be configured to process the translated text-based message. Upon processing the text-based message, audio command agent 512 may be further configured to generate audio commands to be transmitted to user. Wireless connectivity module 518 may be configured to allow computing system 502 to wirelessly connect with one or more I/O devices 522. In some embodiments, wireless connectivity module 518 may be one of a Bluetooth module, NFC module, ZigBee module, and the like.

Computing system 552 may include a processor 554, a memory 556, a storage 558, and a network interface 560. In some embodiments, computing system 552 may be coupled to one or more I/O device(s) 572 (e.g., keyboard, mouse, etc.). In some embodiments, computing system 552 may be in communication with database 106.

Processor 554 retrieves and executes program code 566 (i.e., programming instructions) stored in memory 556, as well as stores and retrieves application data. Processor 554 is included to be representative of a single processor, multiple processors, a single processor having multiple processing cores, and the like. Network interface 560 may be any type of network communications allowing computing system 552 to communicate externally via computing network 505. For example, network interface 560 is configured to enable external communication with computing system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include account handler 562, operating system 564, and program code 566. Account handler 562 may be configured to receive one or more requests from computing system 502 and manage an account associated with the user to carry out the request. Account handler 562 may communicate with database 106. Database 106 may include one or more user profiles. Each user profile may include one or more accounts. Such accounts may include, for example, credit card accounts, savings accounts, checking accounts, and the like. Program code 566 may be accessed by processor 554 for processing (i.e., executing program instructions). Program code 566 may include, for example, executable instructions for communicating with computing system 502 to allow a user to transact at an ATM using audio commands.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of transacting at an automated teller machine (ATM), comprising:
   performing, by the ATM, an authentication operation by:
   receiving a plurality of audible indications from the user, the plurality of audible indications corresponding to an authentication input associated with the user, without audibly revealing any component of the authentication input;
   comparing the plurality of audible indications received from the user to the authentication input associated with the user; and
   upon determining that the plurality of audible indications correspond to the authentication input associated with the user, authenticating the user at the ATM; and
   performing, by the ATM, a transaction operation by:
   generating an audio message comprising one or more transaction operations available at the ATM;
   receiving a second audible indication from the user to select at least one transaction operation of the one or more transaction operations available at the ATM, without audibly revealing the selected transaction operation;
   mapping the second audible indication to a respective transaction operation in the set of transaction operations; and
   processing the selected transaction operation.

2. The method of claim 1, wherein the authentication operation is triggered by:
   receiving, by the ATM, a request to provide audio commands for input associated with authenticating the user at the ATM.

3. The method of claim 2, wherein receiving, by the ATM, the request to provide the audio commands for the input associated with authenticating the user at the ATM, comprises:
   receiving a request to enter a personal identification number (PIN) that comprises one or more digits, each digit corresponding a respective component of the one or more components.

4. The method of claim 2, wherein receiving, by the ATM, the request to provide the audio commands for the input associated with authenticating the user at the ATM, comprises:
   receiving a request to enter a withdrawal amount.

5. The method of claim 1, wherein the authentication operation further comprises:

generating an audio message for each component of the authentication input, wherein the audio message comprises a set of candidate entries for each component.

6. The method of claim 5, wherein generating the audio message for each component of the authentication input is triggered by identifying an auxiliary connection at the ATM.

7. The method of claim 5, wherein generating the audio message for each component of the authentication input is triggered by identifying a client device of the user via wireless connection.

8. A system, comprising:
a processor in selective communication with a microphone and a speaker; and
a memory having programming instructions stored thereon, which, when executed by the processor, performs one or more operations comprising:
performing, by the ATM, an authentication operation by:
receiving a plurality of audible indications from the user, via the microphone, the plurality of audible indications corresponding to an authentication input associated with the user, without audibly revealing any component of the authentication input;
comparing the plurality of audible indications received from the user to the authentication input associated with the user; and
upon determining that the plurality of audible indications correspond to the authentication input associated with the user, authenticating the user at the ATM; and
performing, by the ATM, a transaction operation by:
generating an audio message comprising one or more transaction operations available at the ATM;
receiving a second audible indication from the user, via the microphone, to select at least one transaction operation of the one or more transaction operations available at the ATM, without audibly revealing the selected transaction operation;
mapping the second audible indication to a respective transaction operation in the set of transaction operations; and
processing the selected transaction operation.

9. The system of claim 8, wherein the authentication operation is triggered by:
receiving a request to provide audio commands for input associated with authenticating the user at the ATM.

10. The system of claim 9, wherein receiving the request to provide the audio commands for the input associated with authenticating the user at the ATM, comprises:
receiving a request to enter a personal identification number (PIN) that comprises one or more digits, each digit corresponding a respective component of the one or more components.

11. The system of claim 9, wherein receiving the request to provide the audio commands for the input associated with authenticating the user at the ATM, comprises:
receiving a request to enter a withdrawal amount.

12. The system of claim 8, wherein the authentication operation further comprises:
generating an audio message for each component of the authentication input, wherein the audio message comprises a set of candidate entries for each component.

13. The system of claim 12, wherein generating the audio message for each component of the authentication input is triggered by identifying an auxiliary connection at the ATM.

14. The system of claim 12, wherein generating the audio message for each component of the authentication input is triggered by identifying a client device of the user via wireless connection.

15. A non-transitory computer readable medium including one or more sequences of instructions that, when executed by one or more processors, cause the processors to perform operations comprising:
performing, by the ATM, an authentication operation by:
receiving a plurality of audible indications from the user, the plurality of audible indications corresponding to an authentication input associated with the user, without audibly revealing any component of the authentication input;
comparing the plurality of audible indications received from the user to the authentication input associated with the user; and
upon determining that the plurality of audible indications correspond to the authentication input associated with the user, authenticating the user at the ATM; and
performing, by the ATM, a transaction operation by:
generating an audio message comprising one or more transaction operations available at the ATM;
receiving a second audible indication from the user to select at least one transaction operation of the one or more transaction operations available at the ATM, without audibly revealing the selected transaction operation;
mapping the second audible indication to a respective transaction operation in the set of transaction operations; and
processing the selected transaction operation.

16. The non-transitory computer readable medium of claim 15, wherein the authentication operation is triggered by:
receiving, by the ATM, a request to provide audio commands for input associated with authenticating the user at the ATM.

17. The non-transitory computer readable medium of claim 16, wherein receiving, by the ATM, the request to provide the audio commands for the input associated with authenticating the user at the ATM, comprises:
receiving a request to enter a personal identification number (PIN) that comprises one or more digits, each digit corresponding a respective component of the one or more components.

18. The non-transitory computer readable medium of claim 16, wherein receiving, by the ATM, the request to provide the audio commands for the input associated with authenticating the user at the ATM, comprises:
receiving a request to enter a withdrawal amount.

19. The non-transitory computer readable medium of claim 15, wherein the authentication operation further comprises:
generating an audio message for each component of the authentication input, wherein the audio message comprises a set of candidate entries for each component.

20. The non-transitory computer readable medium of claim 19, wherein generating the audio message for each component of the authentication input is triggered by identifying an auxiliary connection at the ATM or identifying a client device of the user via wireless connection.

* * * * *